United States Patent
Cattaneo

(10) Patent No.: US 6,840,698 B2
(45) Date of Patent: Jan. 11, 2005

(54) CONNECTION DEVICE FOR THE REALIZATION OF A TUBULAR-FRAME STRUCTURE FOR SUPPORTING SURFACES

(75) Inventor: Carlo Cattaneo, Como (IT)

(73) Assignee: Leonardo S.r.l., Figino Serenza (IT)

(*) Notice: Subject to any disclaimer, the term of this patent is extended or adjusted under 35 U.S.C. 154(b) by 78 days.

(21) Appl. No.: 10/079,121

(22) Filed: Feb. 19, 2002

(65) Prior Publication Data

US 2002/0114662 A1 Aug. 22, 2002

(30) Foreign Application Priority Data

Feb. 22, 2001 (IT) .................................. MI2001A0355

(51) Int. Cl.⁷ .................................................. F16B 7/04
(52) U.S. Cl. ...................... 403/170; 403/171; 403/217; 403/297
(58) Field of Search ............................. 403/7, 22, 165, 403/170–172, 217, 297, 361, 373; 411/107, 401, 508, 509, 517, 913; 108/155, 156, 158.11

(56) References Cited

U.S. PATENT DOCUMENTS

| 1,407,570 | A | * | 2/1922 | Peirce | 411/17 |
|---|---|---|---|---|---|
| 3,277,770 | A | * | 10/1966 | McCullock | 411/65 |
| 3,638,803 | A | * | 2/1972 | MacMillan | 108/159 |
| 3,701,553 | A | * | 10/1972 | Vogt | 403/189 |
| 3,743,332 | A | * | 7/1973 | Sonolet | 403/172 |
| 3,822,101 | A | * | 7/1974 | Schneider | 403/295 |
| 3,901,613 | A | * | 8/1975 | Andersson | 403/178 |
| 3,958,889 | A | * | 5/1976 | Berkowitz | 403/172 |
| 3,967,525 | A | * | 7/1976 | Lerich | 411/69 |
| 4,027,987 | A | * | 6/1977 | Berkowitz | 403/172 |
| 4,249,830 | A | * | 2/1981 | Day | 403/7 |
| 4,291,999 | A | * | 9/1981 | Vandelanoite | 403/297 |
| 4,318,629 | A | * | 3/1982 | Yamamoto | 403/297 |
| 4,344,719 | A | * | 8/1982 | Thom | 403/297 |
| 5,598,790 | A | * | 2/1997 | Fich | 108/158.11 |
| 5,904,437 | A | * | 5/1999 | Allen | 403/170 |
| 6,024,024 | A | * | 2/2000 | Favaretto | 108/64 |
| 6,729,244 | B2 | * | 5/2004 | Cattaneo | 108/155 |

FOREIGN PATENT DOCUMENTS

| CH | 438 848 | * | 6/1967 | 403/171 |
|---|---|---|---|---|
| EP | 0 226 654 A1 | * | 7/1987 | |
| EP | 0 399 371 | | 11/1990 | |
| EP | 0 847 715 | | 6/1998 | |
| EP | 0 972 466 A2 | * | 1/2000 | |
| EP | 0 976 346 | | 2/2000 | |
| EP | 0 976 346 A2 | * | 2/2000 | |
| EP | 1 234 526 A1 | * | 2/2002 | |
| EP | 1 279 353 A1 | * | 7/2002 | |
| EP | 1 234 986 A1 | * | 8/2002 | |
| FR | 1349424 | * | 12/1963 | |
| FR | 2 578 297 | * | 9/1986 | |

OTHER PUBLICATIONS

EP Search Report.

* cited by examiner

Primary Examiner—Robert J. Sandy
Assistant Examiner—Ruth C. Rodriguez
(74) Attorney, Agent, or Firm—Hedman & Costigan, P.C.

(57) ABSTRACT

A connection device for the realization of a tubular-frame structure for supporting surfaces constituted by a body (18) from which projects at least one socket (19) for connecting to tubular profiles (15) and possibly, in a generic perpendicular direction or at an angle, projects a connector (20) for the removable connection of a leg (14), in which said at least one socket (19) has a non-continuous external wall (21), which defines a seat (22), attached at the base by an abutment surface (42) for a blocking means, with a threaded hole (25) which houses an operation grain (23).

5 Claims, 8 Drawing Sheets

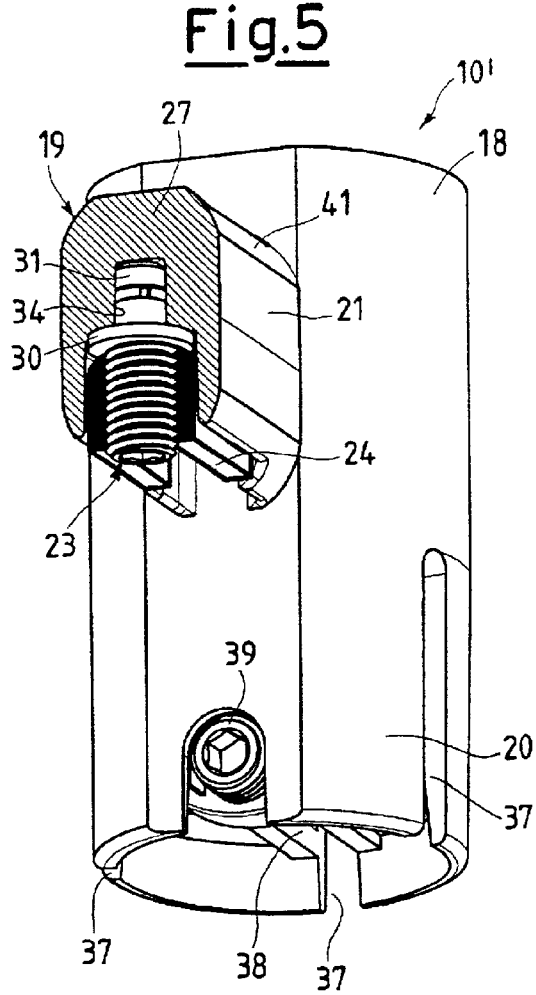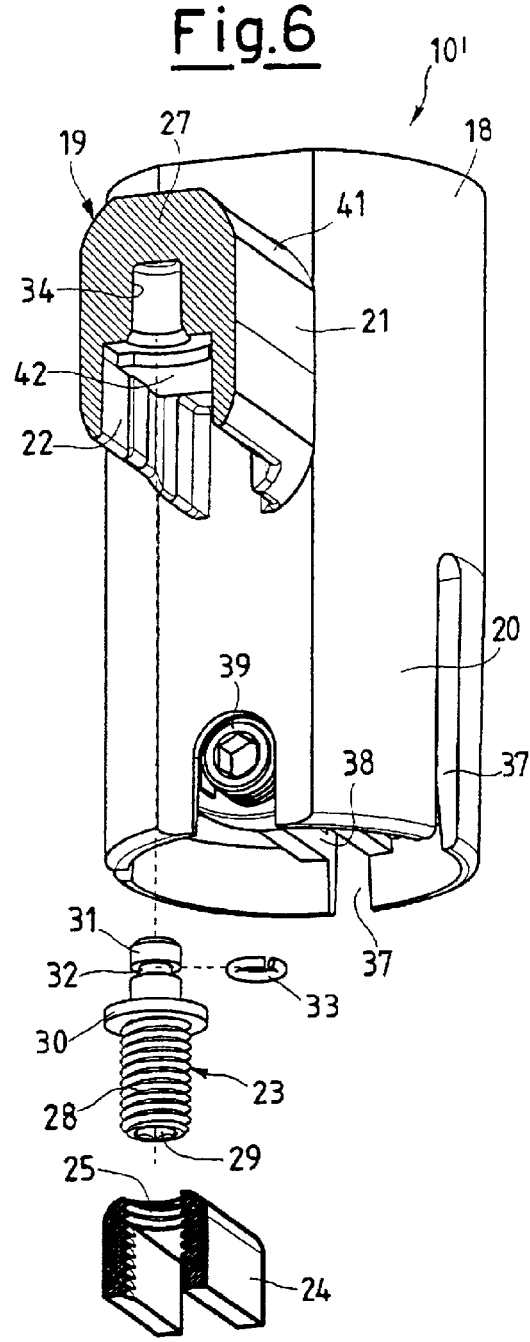

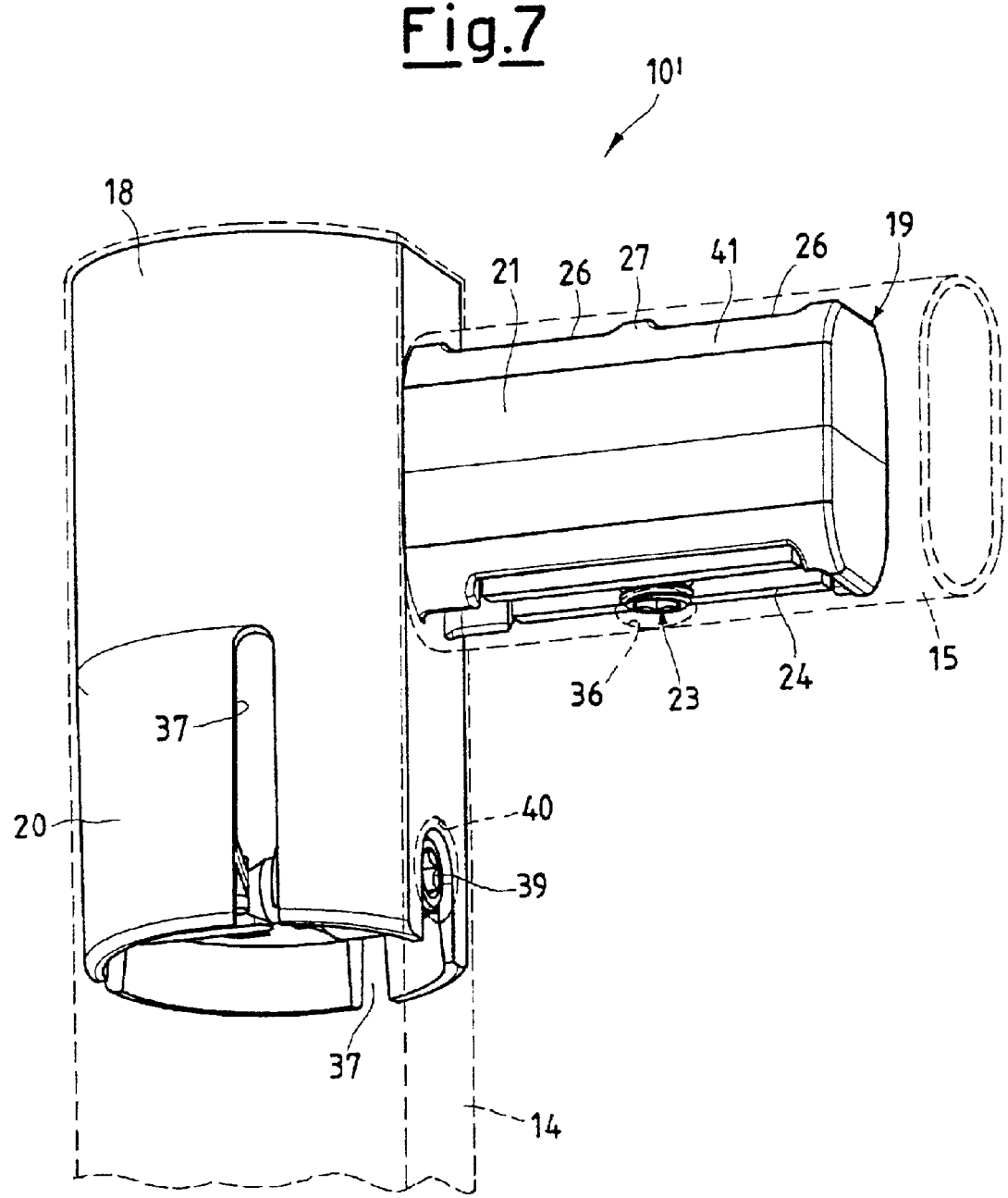

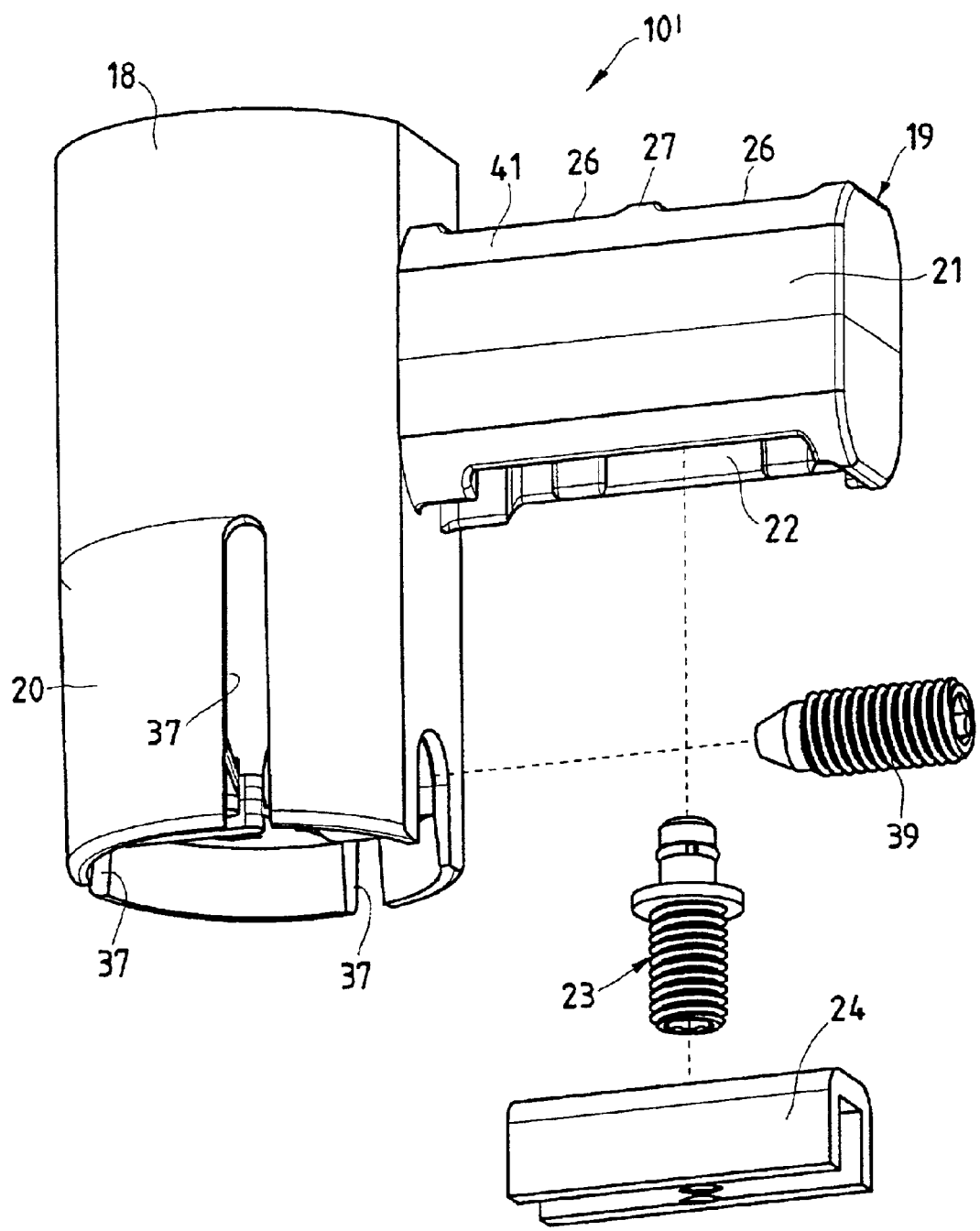

US 6,840,698 B2

CONNECTION DEVICE FOR THE REALIZATION OF A TUBULAR-FRAME STRUCTURE FOR SUPPORTING SURFACES

The present application claims priority to Italian Patent Application Ser. No. MI 2001A 000355, filed Feb. 22, 2001.

BACKGROUND OF THE INVENTION

The present invention refers to a connection device for the realisation of a tubular-frame structure for supporting surfaces, particularly but not exclusively for the production of tables.

As is well known to men skilled in the art, the realisation of office desks requires a high degree of flexibility in configuration and arrangement of supporting surfaces, combining functionality and appearance.

The need to cut production costs and to also allow companies which are not specialised in making office furniture to offer a wide range of solutions to their customers, which are able to satisfy the most varying requirements, led to the development of modular solutions.

What's more, tables, or generic work posts, are generally made up, for practicality, to as great an extent as possible of separable parts to make transportation and storage easier, significantly reducing encumbrance.

In the case of a tubular-frame structure the single components, the legs and the tubular profiles, can be linked through connection devices.

The use of separable connection devices allows the re-use of the elements of the frame for the realisation of new structures with different arrangements of supporting surfaces.

It is important that such connection devices allow fast assembly, with normal work tools, even by non-specialised people.

The connection of the elements of the structure thus obtained must be stable, to obtain a solid structure without the risk of deterioration of the materials used.

The structure obtained from the assembly of the framework through connection devices must be self-supporting and must not thus be dependent upon the supporting surface for the characteristic of rigidity which is required.

SUMMARY OF THE INVENTION

The general purpose of the present invention is to propose a connection device for the realisation of a tubular-frame structure for supporting surfaces which adequately satisfies all the requirements mentioned above in an extremely simple, cost-effective and particularly functional way.

Such a purpose, according to the present invention, is achieved through a connection device for the realisation of a tubular-frame structure for supporting surfaces, having the characteristics outlined in the claims attached.

The structural and functional characteristics of the present invention and its advantages compared to the prior art will become even more clear and evident from an examination of the following description, referring to the attached drawings, which show a connection device realised according to the innovative principles of the invention itself.

In the drawings:

BRIEF DESCRIPTION OF THE DRAWINGS

FIGS. 5 and 6 are partially sectioned perspective views of a second example of an embodiment of a device for connecting profiles with legs;

FIG. 7 is a perspective view of the device in FIGS. 5 and 6 inserted into a profile and a leg, represented with a dotted line;

FIG. 8 shows an exploded view of the connection device in FIG. 7 taken out from the profile and leg;

DETAILED DESCRIPTION OF THE INVENTION

Figure 1:
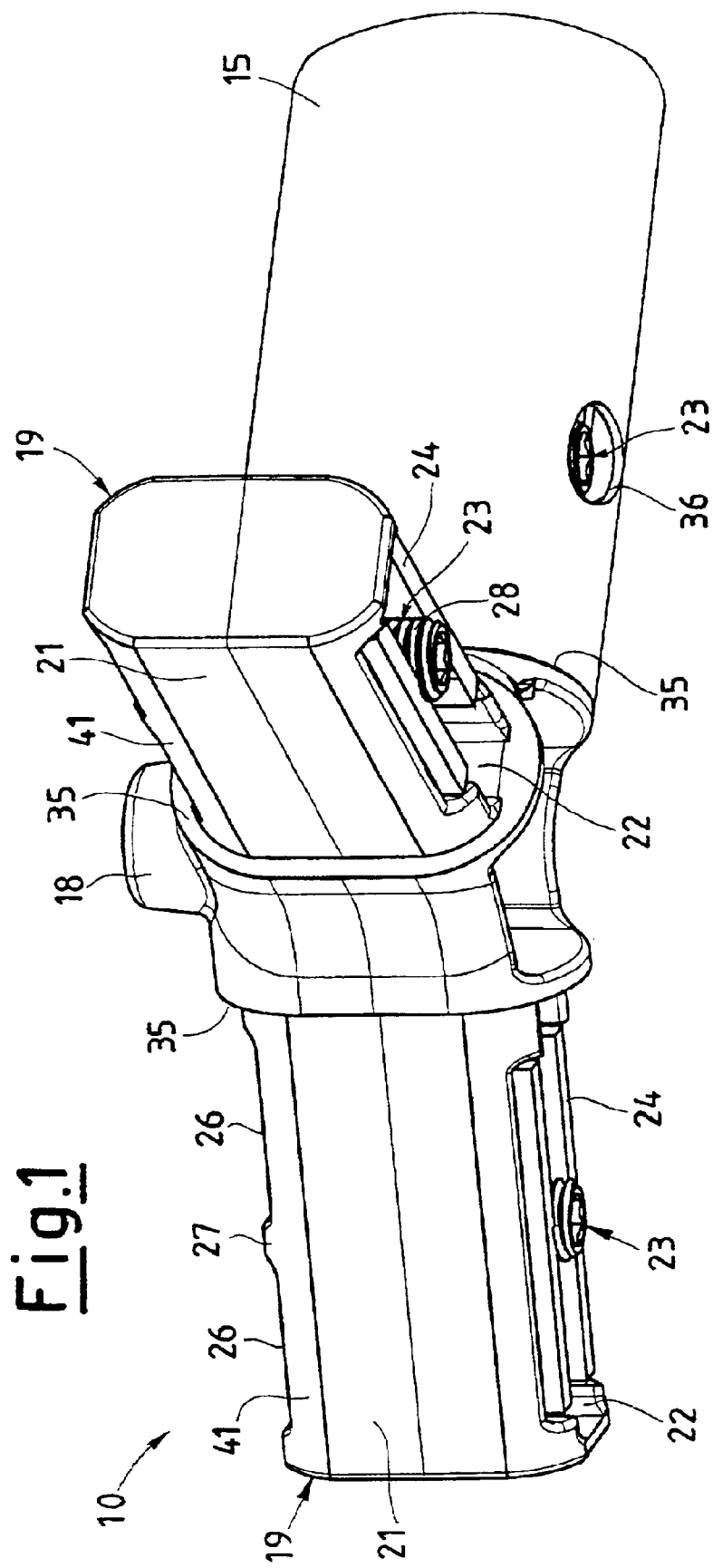
FIG. 1 is a side view of a first example of an embodiment of a device for connecting profiles with three sockets of which one is inserted into a profile.
Figure 2:
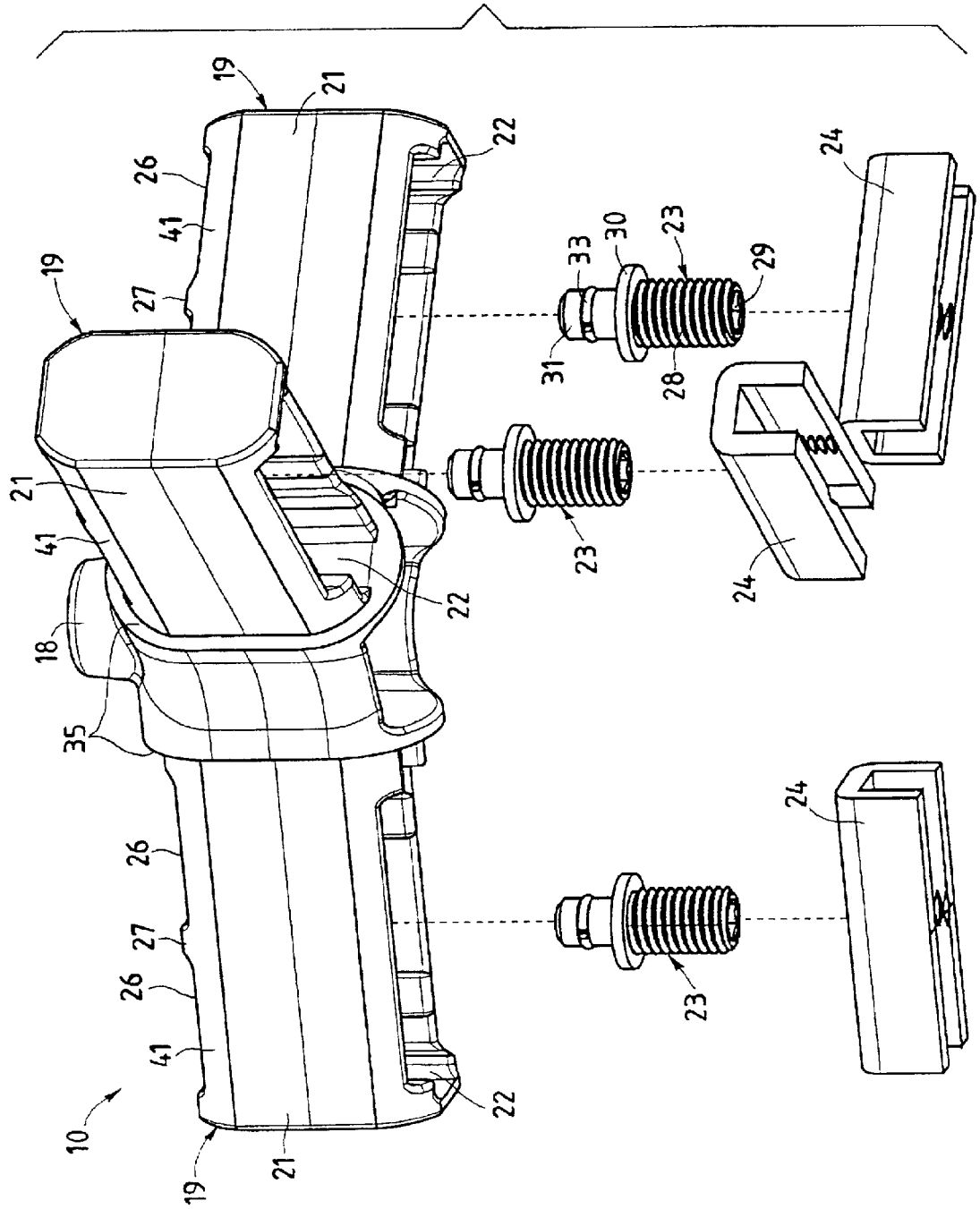
FIG. 2 shows an exploded view of the connection device in FIG. 1 pulled out from the profile.
Figure 3:
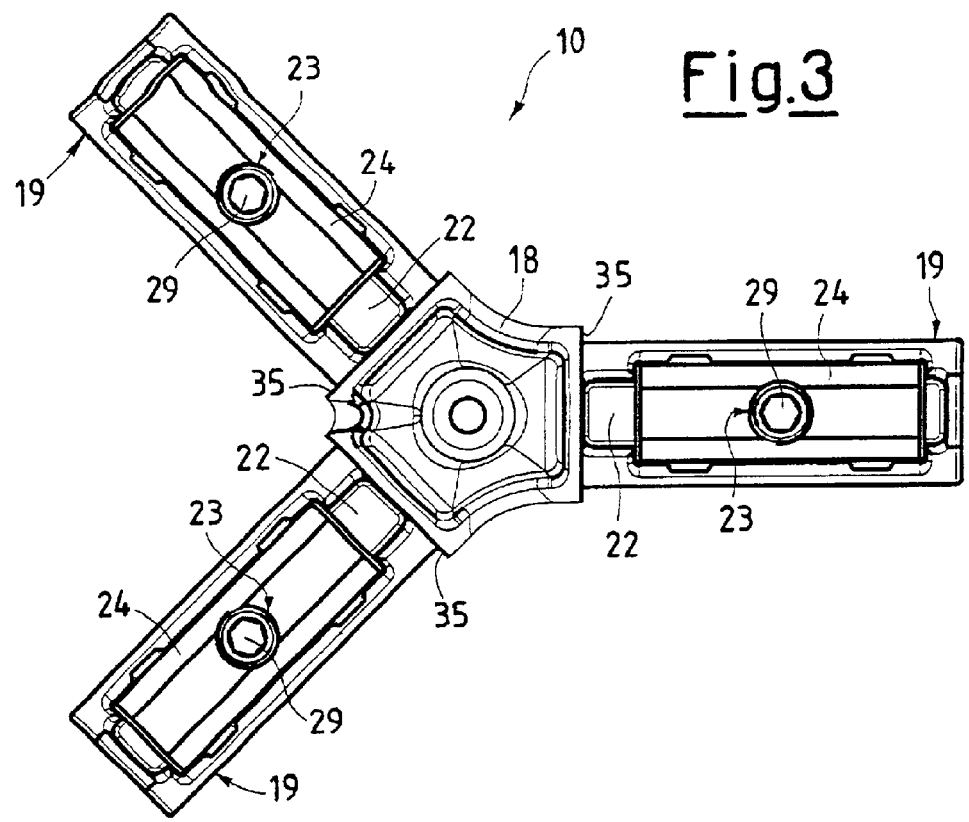
FIG. 3 is a plan view from below of the device in FIG. 1.
Figure 4:
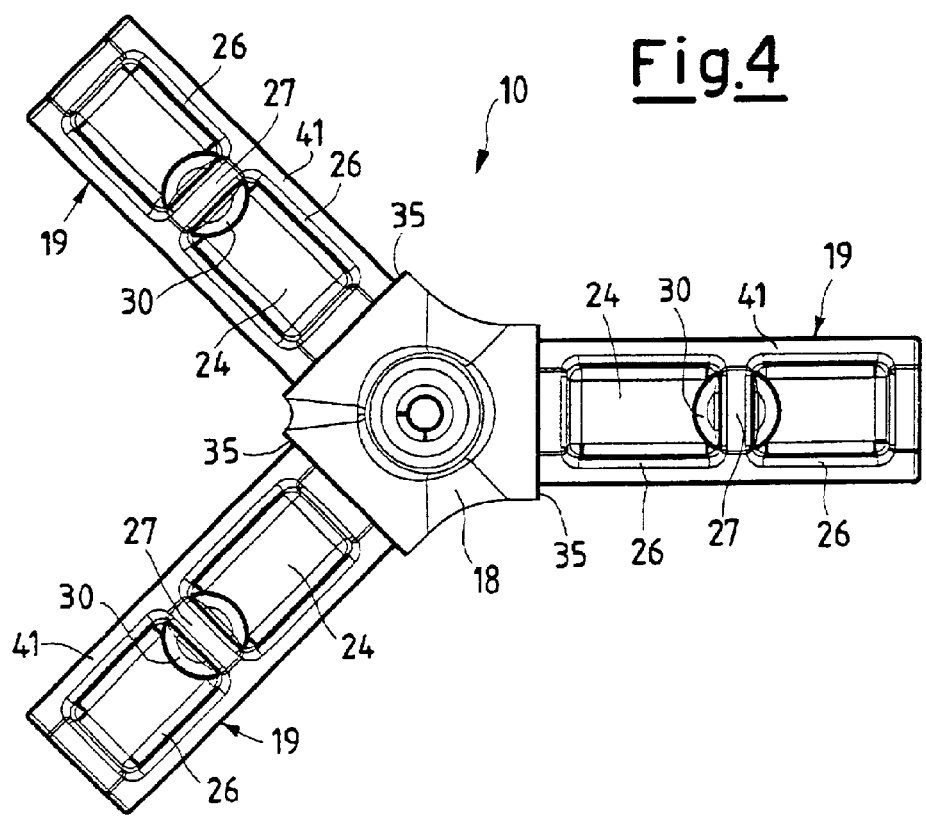
FIG. 4 is a plan view from above of the device in FIG. 1.
Figure 9:
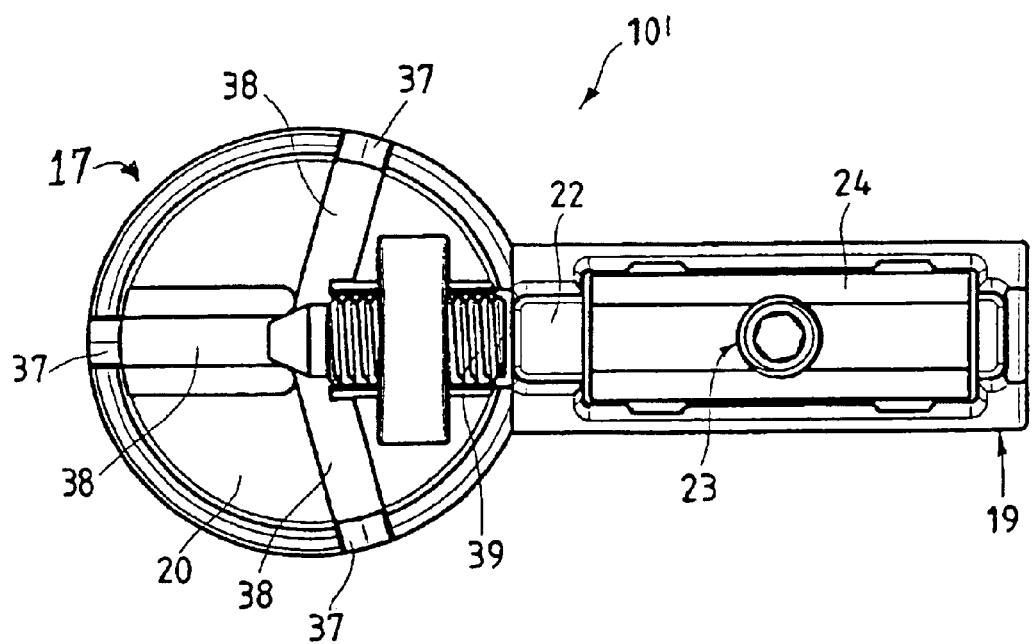
FIG. 9 is a plan view from below of the connection device according to the second example of an embodiment.

With reference to the drawings, a connection device for the realisation of a tubular-frame structure for supporting surfaces as a whole is generally indicated with 10 or 10', and in the examples of embodiments illustrated according to the present invention, comprises a body 18, from which projects at least one sockets 19 for connecting with tubular profiles 15, forming the frame of the structure and, in a generic direction, perpendicular or at an angle, with respect to said sockets 19, also possibly projects a connector 20 for the firm connection of a leg 14.

As an example, in FIGS. 1–4 the device 10 for connecting profiles, carrying three sockets 19 radially projecting outwards from the body 18. Each socket 19 is suitable for being slotted into the ends of the tubular profiles 15, generally metallic and shaped complementarily, and fixed rigidly to them, as exemplified in FIG. 1.

Body 18 and sockets 19 can be realised in one piece, generally metal, for example aluminium, or even in plastic, having the necessary physical and mechanical characteristics for the purpose of the device.

The body 18 can, moreover, be solidly connected to the supporting surface of the tubular-frame structure (not shown).

The socket 19 has a non-continuous external wall 21 which, when the device is attached, makes contact with the inside of the tubular profiles 15 only along the curved portions 41 opposite a beam 24 which will be described hereafter. The wall 21 defines a seat 22, bound at the base by an abutment surface 42, which receives a threaded operation grain 23, a blocking means and said U-beam 24, equipped with a threaded hole 25, elements which can be seen in the exploded representation in FIG. 2. The external wall 21 can, moreover, be partially dismantled into portions 26, diametrically opposed to the seat 22 provided that it projects out to form a bridge 27 of dense material in correspondence with the operation grain 23. These details are clearly visible in the representations 5 and 6, referring to a second example of an embodiment of the device 10' for connecting profiles 15 and legs 14, in which the socket 19 is sectioned in correspondence with the bridge 27.

The operation grain 23 is composed of a threaded shaft 28, equipped with a socket head seat 29 for actuation through a complementary key (not shown), an abutment crown 30 and a shaft 31, equipped with a groove 32 for housing a sealing element 33 in the form of a broken ring made of hardened steel.

The operation grain 23 engages in the threaded hole 25 of the beam 24 until the crown 30 can no longer move. The shaft 31, at the other end, is inserted into a hole 34 formed in the seat 22 in the middle portion of the abutment surface 42, until it abuts against the crown 30. The operation grain 23 is thus locked to the sockets 19 through the tightening of the ring 33.

The sockets 19 of the connection device 10 or 10', thus arranged, is fitted into the complementary tubular profile 15, until the end of the profile abuts against an abutment surface 35 of the body 18 in the position represented in FIG. 1. Access to the operation grain 23 is realised through a hole 36, found on the tubular profile 15, which in this position is lined up with the socket head seat 29 for actuation through a key.

The shaft 31 of the operation grain 23, locked in the hole 34, is able to rotate, but not to move along its axis. The actuation of said grain 23 thus causes the screwing of the threaded shaft 28 into the complementary hole 25 of the beam 24, which being locked into the seat 22 is forced to move along said seat 22, to put itself into a pulled out position.

Figure 10:
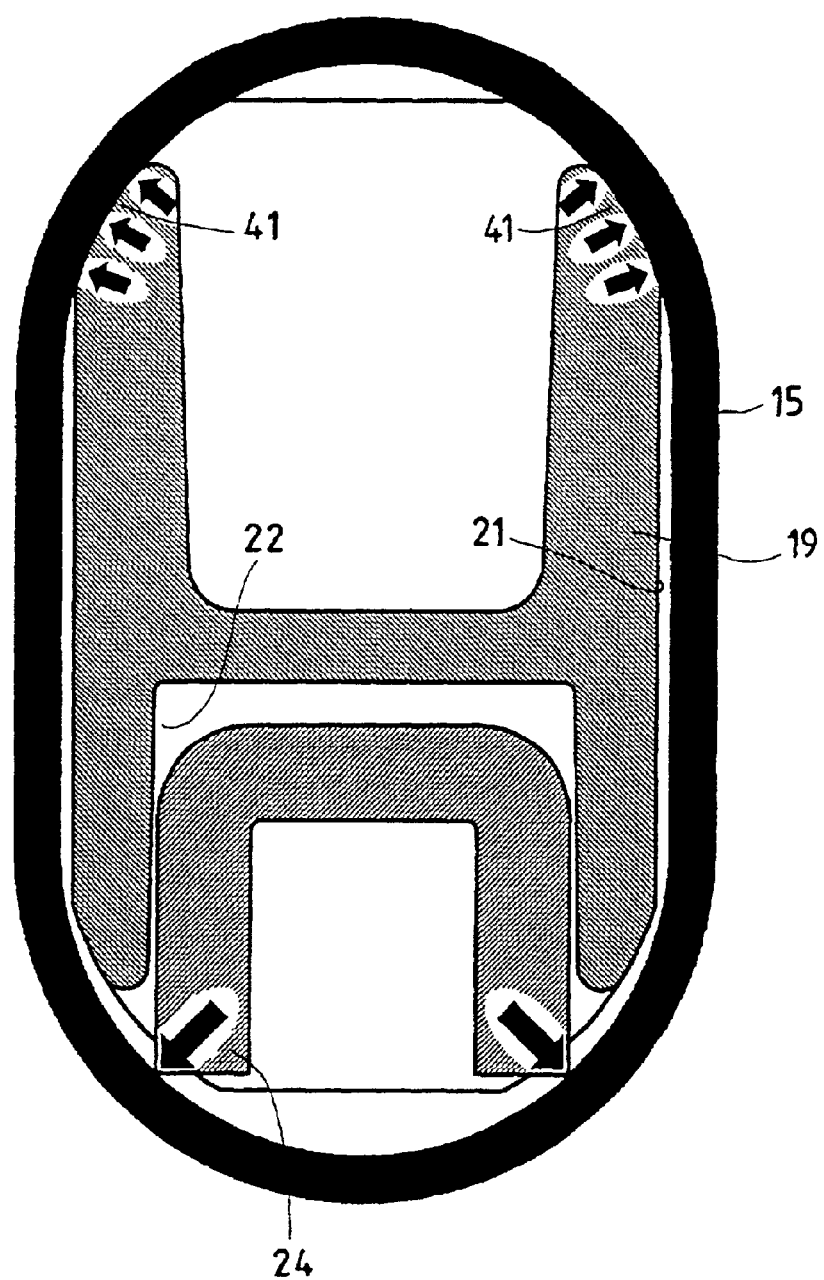
FIG. 10 is a cross-section illustrating the behaviour of the sockets (19) in association with the profile (15), through the beam (24).

Accordingly, the external wings of the beam 24 engage on the internal surface of the profile 15, thus forcing only the curved portions 41 of the external wall 21, opposite said beam 24 (see FIG. 10), to become engaged permanently with the profile 15.

The tubular profile 15 can be separated from the sockets 19 by unscrewing the operation grain 23, so as to take the beam 24 back to a position inside the seat 22 which does not cause interference.

A connection which is stable and durable in time, which can still be easily dismantled, between a tubular profile 15 and the sockets 19 is thus obtained.

The connection devices 10' foresee, besides the sockets 19 for the profile 15, also a system for coupling with the tubular leg 14. Such coupling systems can be of various types, such as, for example, threaded coupling, threaded-shaft nut or bolt-threaded hole, or else expansion coupling, as in the example already shown in FIGS. 5 and 6.

The connection device 10', shown in FIGS. 5–9, is equipped with a connector 20 for rigid connection to a leg 14, which projects form the body 18 in a generic direction, perpendicular or at an angle, with respect to the sockets 19.

The connector 20 is composed of an expandable cylindrical body, equipped with a plurality of notches 37 along the generatrices of the cylinder, which interlock with radial notches 38, on which acts a grain 39, operable with a key, which engages in a threaded seat.

To attach the legs 14 it is sufficient to fit them onto the connector 20 of the connection device 17 being careful to line up a hole 40 located on the cylindrical wall of the leg 14 with the operation grain 39 of the connector 20 (FIG. 7). The operation of the grain 39 causes the expansion of the cylindrical body of the connector 20 and thus a connection which is firm, yet which can be dismantled, of the tubular legs 14 to form the frame structure.

The legs used can be realised in different materials, possibly even wood and of a generic type. The only restriction in this respect is that they must be tubular and designed to interact with the device 10' for connection between profile and leg.

The final assembly stage of the legs 14, as described in the example, can easily be carried out at the time of the definitive assembly of the tubular-frame structure for supporting surfaces at the premises of the end user using only a common socket head key.

From the above description with reference to the figures, it becomes clear how a connection device 10 or 10' for the realisation of a tubular-frame structure for supporting surfaces according to the present invention is particularly useful and advantageous. The purpose mentioned in the preamble to the description is thus achieved.

Of course, the forms of the connection device for the realisation of tubular-frame structures for supporting surfaces, object of the present invention, can be different from that shown only as a non-limiting example in the drawings, just as the materials can also be different.

The scope of protection is thus defined in the claims attached.

What is claimed is:

1. Connection device for a tubular-frame structure for supporting surfaces comprising a body (18) from which projects at least one socket (19) for connecting to tubular profiles (15) in a perpendicular direction or at an angle, said body (18) having a projecting connector (20) for releasable connection of a tubular leg (14), said at least one socket (19) having a non-continuous external wall (21), which defines an internal seat (22) that is attached at a base by an abutment surface (42) for a blocking means, carrying a threaded hole (25) which houses an operation grain (23) which has complimentary threads at a first end to engage said threaded hole (25), said operation grain (23) having an abutment crown (30) above said complimentary threads and at a second end opposite the end having threads, an unthreaded shaft (31) that has a groove (32) for housing a sealing element (33) comprising a broken ring, said socket (19) having a hole (34) adapted for housing said unthreaded shaft (31) and said sealing element (33) of said operation grain (23 said connector (20) being composed of an expandable cylindrical body comprising a plurality of notches (37, 38) upon which acts a second operation grain (39), which can be operated through a key from outside said tubular leg (14).

2. Device according to claim 1, wherein said blocking means is a beam (24) which has a U-shaped cross-section.

3. Device according to claim 1, wherein said blocking means causes or prevents connection by interfering only with curved portions (41) of said external wall (21), opposite a beam (24), with a tubular profile (15) moving along in said seat (22) controlled by said operation grain (23).

4. Device according to claim 1, wherein said tubular profile (15) is fitted until said tubular profile (15) abuts against an abutment surface (35) of said body (18).

5. Device according to claim 1, wherein said operation grain (23) can be accessed through a hole (36) on a tubular profile (15) fitted onto said at least one socket (19).

* * * * *